United States Patent [19]
Williamson

[11] 3,918,279
[45] Nov. 11, 1975

[54] BICYCLE STAND-LOCK APPARATUS

[75] Inventor: Donald J. Williamson, Broomfield, Colo.

[73] Assignee: United States Steel Corporation, Pittsburgh, Pa.

[22] Filed: Oct. 3, 1973

[21] Appl. No.: 403,110

[52] U.S. Cl. .................................. 70/234; 211/5
[51] Int. Cl.² ........................................ E05B 71/00
[58] Field of Search ............ 70/200, 203, 234, 235; 211/5, 17, 18, 19, 20, 21, 22; 292/104, 205; 224/42.03 B, 42.45 R; 248/121, 203, 221

[56] References Cited
UNITED STATES PATENTS

| | | | |
|---|---|---|---|
| 608,464 | 8/1898 | Lewis | 211/5 |
| 1,120,542 | 12/1914 | Rogers | 211/8 |
| 1,202,444 | 10/1916 | Soleau | 211/4 |
| 1,414,390 | 5/1922 | Woollard | 70/200 |
| 2,248,170 | 7/1941 | Hansen | 224/42.45 R |
| 3,651,786 | 3/1972 | Patterson et al. | 119/17 |
| 3,739,609 | 6/1973 | Kaufmann | 70/234 |
| 3,783,659 | 1/1974 | Rossi | 70/234 |

FOREIGN PATENTS OR APPLICATIONS

| | | | |
|---|---|---|---|
| 183,435 | 3/1907 | Germany | 70/234 |

Primary Examiner—Albert G. Craig, Jr.
Attorney, Agent, or Firm—William L. Krayer

[57] ABSTRACT

Bicycle stand-lock apparatus for supporting and protecting one or a plurality of bicycles against theft. For each bicycle there is a post and a locking arm movable relative to the post that is generally C-shaped and pivotally mounted at its lower end at an intermediate portion of the post and swings from an open position arranged for access by a bicycle frame for approach from opposite directions to a closed position to surround the bicycle frame between the front and rear wheels thereof. The post and locking arm carry cooperative lugs with alinable apertures through which a padlock-type member or the like is inserted. For accomodating a plurality of bicycles, a series of the posts are provided by a framework made of relatively heavy metal pipe having a plurality of spaced upright post sections joined by alternately upper and lower horizontally disposed connecting sections.

13 Claims, 13 Drawing Figures

BICYCLE STAND-LOCK APPARATUS

BACKGROUND OF THE INVENTION

This invention relates generally to bicycle locks and more particularly to a bicycle stand-lock apparatus for one or more bicycles and the like.

With the increased usage of bicycles there is a corresponding need for an efficient way to lock them to prevent the theft when they are parked in a variety of places including the home garage, a public area, private parking lot or like places. Some attempts have been made to lock the wheels to a post or the like with a chain and padlock but this is not entirely satisfactory in that some structure is required to support the bicycle and with this prior approach the wheels can be quickly detached from the frame and/or a chain can be readily removed with the use of a scissor-like cutter or the like. Moreover, prior known bicycle racks or locks have not been of a sufficiently durable construction to satisfactorily inhibit theft.

Accordingly, it is an object of this invention to provide a novel and improved lock apparatus for bicycles that is readily usable with a variety of bicycle sizes and styles and will support the bicycle in an upright position.

Another object of this invention is to provide bicycle stand-lock apparatus that is comparatively simple and inexpensive to manufacture, durable, has a high reliability for preventing theft and can be approached for use by wheeling it up thereto from opposite directions with a bicycle.

Yet a further object of this invention is to provide bicycle stand-lock apparatus that is highly flexible so as to be readily expanded to accomodate a selected number of bicycles.

Another object of this invention is to provide novel bicycle stand-lock apparatus that may be readily made from a relatively heavy gage metal pipe and is not subject to a fast destruction by a potential thief.

Still another object of this invention is to provide novel bicycle stand-lock apparatus that will support the bicycle in a substantially upright position as well as protect against theft principally characterized by having a single swinging arm for each bicycle pivotally mounted on an intermediate portion of a post that will surround the bicycle frame in the closed position and is readily locked in a closed position to prevent removal of the bicycle therefrom.

SUMMARY OF THE INVENTION

In accordance with the present invention in preferred embodiments shown there is provided a single post or a plurality of spaced posts each having a locking arm for accomodating a bicycle. Each locking arm is generally C-shaped and is pivotally mounted at the lower end on an intermediate portion of the post and depends in the open position to facilitate the juxtapositioning of the bicycle adjacent the post and depending locking arm and swing up to a closed position to surround the bicycle frame with the upper end being adapted to be locked to the post by means of a padlock or the like. The post and locking arm are made of a relatively heavy gage metal pipe and for more than one bicycle a framework with a plurality of upright post sections are joined at the upper and lower ends by alternating upper and lower cross-connecting sections. The framework providing the posts is anchored in the concrete or fastened thereto by bolts or a retaining flange with threads or in the alternative may have an arm at the upper end to attach it to a wall or the like.

Other objects, advantages and capabilities of the present invention will become more apparent as the description proceeds taken in conjunction with the accompanying drawings, in which:

FIG. 9 is an enlarged elevation view of an alternative manner of mounting the post from a wall or the like;

Figure 1:
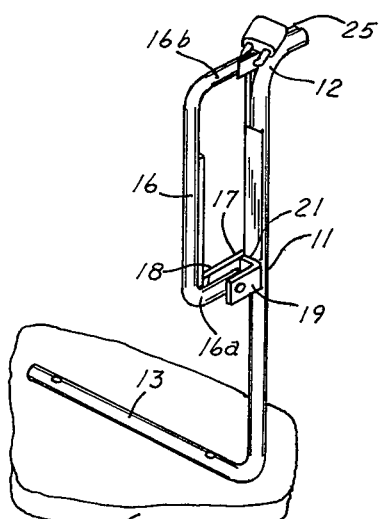
FIG. 1 is a perspective view of bicycle standlock apparatus for a single bicycle having a fixedly secured base attached to a concrete floor.
Figure 2:
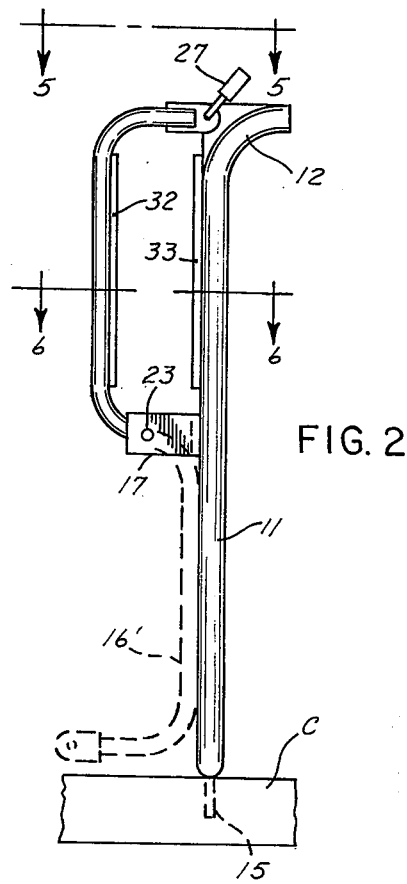
FIG. 2 is a front elevation view of the apparatus shown in FIG. 1 with the open position shown in dashed lines.
Figure 3:
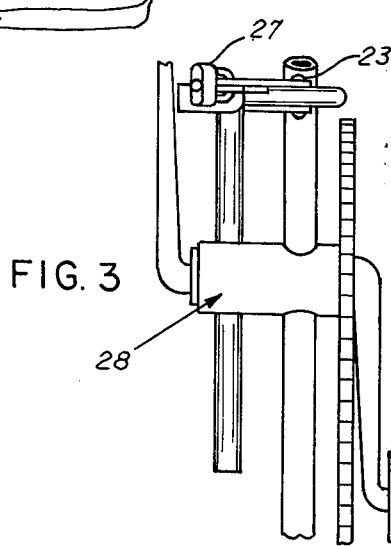
FIG. 3 is a top plan view thereof with a fragment of the bicycle shown in an upright locked position.
Figure 4:
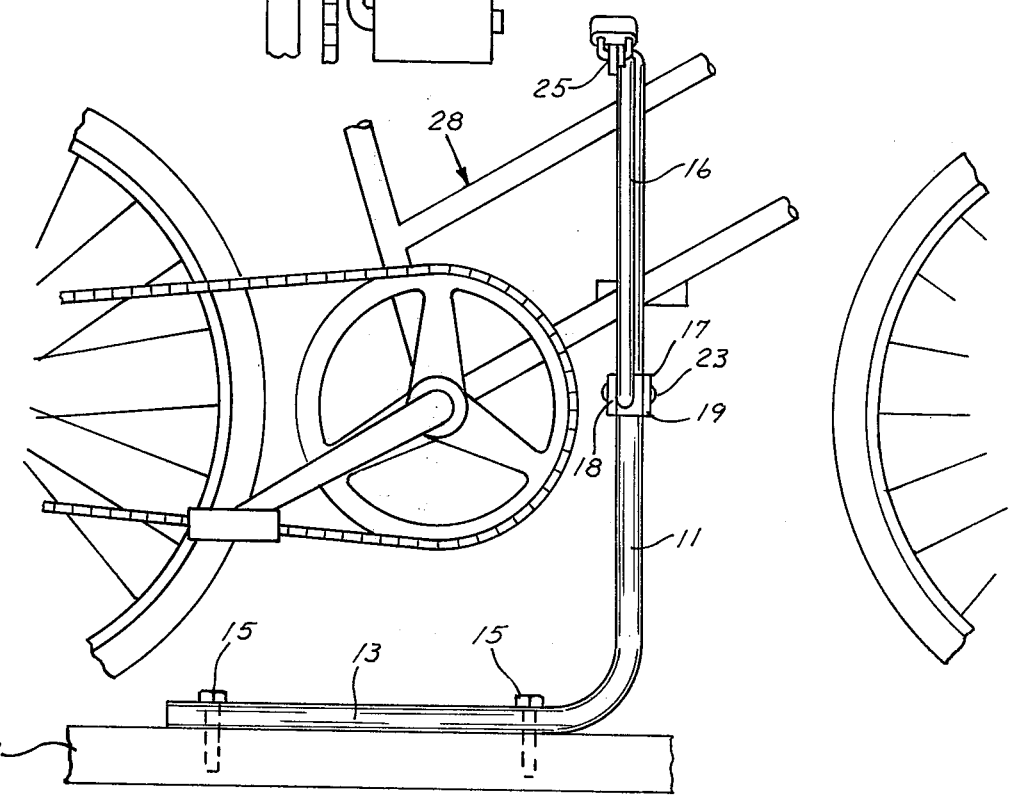
FIG. 4 is a side elevation view also showing a portion of the bicycle frame.
Figure 5:
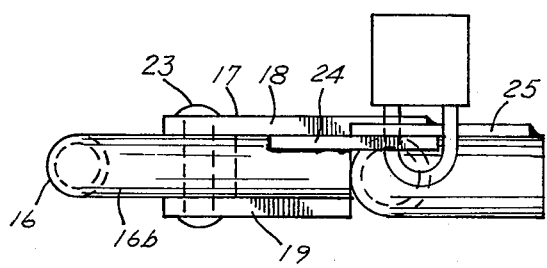
FIG. 5 is an enlarged top plan view of a fragment of the apparatus shown in FIGS. 1 through 4 showing the slidable connection between the upper end of the locking arm and the post.
Figure 6:
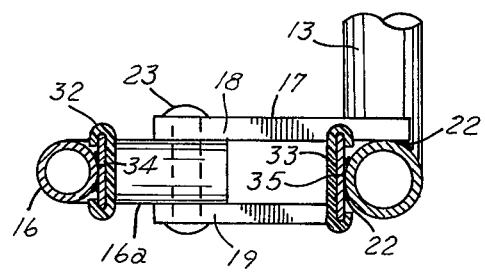
FIG. 6 is an enlarged view taken along lines 6—6 of FIG. 2.

Referring now to the drawings in FIGS. 1 through 6 there is shown bicycle stand-lock apparatus comprised of an upright post 11 having a top section 12 at the upper end extending at right angles to the post in an outturned lateral direction and a lower base section 13 at the lower end. The base section also extends at right angles to the bottom of the post in a rearward direction and is fixedly secured to the top of a base support such as a concrete floor designated C by bolt fasteners 15.

In describing the specific embodiments herein chosen for illustrating the invention, certain terminology is used for convenience which will be recognized as being employed only for convenience and having no limiting significance. For example, the terms "forward" and "rearward" will refer to the directions toward and away from the post as shown in FIG. 1 and specifically with the base extending "rearwardly". The terms "inward" and "outward" refer to directions toward and away from the geometric center of the apparatus.

A generally C-shaped locking arm 16 has a lower inwardly turned end portion 16a pivotally mounted on an intermediate portion of the post 11 by means of a U-shaped support 17 having a pair of spaced arms 18 and 19 forming a slot and a right angle bracket portion 21 shown secured to the post 11 by welds represented at 22, there being a hinge pin or rivet 23 extending through apertures in the spaced arms and through the lower inturned end portion of the locking arm. The upper inwardly inturned free end portion 16b of the locking arm has in a lug 24 welded in a recess in an end portion thereof and has an aperture which aligns with an aperture in a lug 25 mounted on the upper end of the post.

In use, the locking arm 16 will depend from the lower pivot 23 in the open position with the locking arms projecting laterally outwardly and away from the post as represented at 16' and a bicycle represented at 28 can be driven up along side the post and depending lock arm from either of opposite directions which in the orientation shown would be a front or rear approach. The locking arm 16 is then pivoted to swing upwardly to a closed position with the apertures and the lugs 24 and 25 aligned with one another and the padlock member 27 extends through these lugs and locks them together to lock the locking arm in the closed position. The locking arm and upper portion of the post above the lower pivot 23 are shown to surround the frame of the bicycle just forwardly of the sprocket between the front and rear wheels represented at 28. Again the bicycle 28 can be driven up by using a front approach or rear approach to the apparatus. To remove the bicycle, the padlock is removed and the locking arm 16 swung down to a depending position shown in dashed lines at 16'.

The stand-lock apparatus shown in FIGS. 1 through 6 has a cushion or pad 32 mounted along the inside of the intermediate portion of the locking arm and a cushion or pad 33 on the post opposite pad 32 to prevent scratching of the bicycle frame. In the construction shown, the pads 32 and 33 are mounted on flat strips 34 and 35, respectfully, welded to the associated arm 16 and post 11, respectfully. It is understood, however, that the pads and supports are an optional feature and may be deleted if desired to reduce costs.

Figure 7:
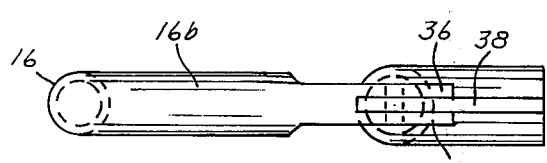
FIG. 7 is an enlarged top view of an alternative form of fastening at the upper end of the locking arm.
Figure 8:
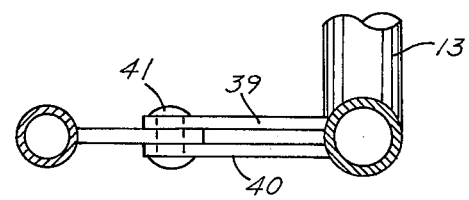
FIG. 8 is a top view of an alternative way of pivotally fastening the lower end of the locking arm.

Referring now to FIGS. 7 and 8 there is shown an alternative structure for mounting the locking arm 16 on the post 11. In this arrangement the upper end of the locking arm terminates in a yoke comprised of two lugs or arms 36 and 37 forming a center slot, the lugs having alined apertures. A central lug 38 is mounted on top of the post and fits in the slot in the closed position. In turn, the lower end of the locking arm is supported by two lugs 39 and 40 welded directly to the post forming a slot that will slidably receive the lower end of the locking arm and support a hinge pin 41. The operation in this form is the same as that of the form shown in FIGS. 1 through 6.

Figure 9:
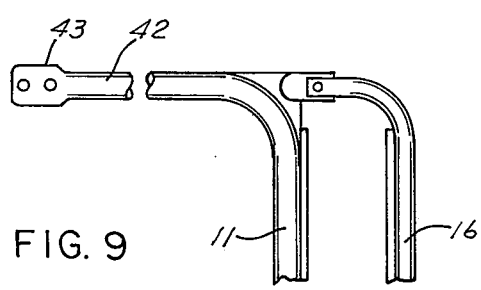

As an alternative to the mounting arrangement shown in FIG. 9 for some applications such as in the home garage, the top section represented at 42 may be extended from that shown in FIG. 1 and terminated in a flattened end portion 43 with apertures to facilitate the bolting of the post to an upright wall, stationary post or the like.

Figure 10:
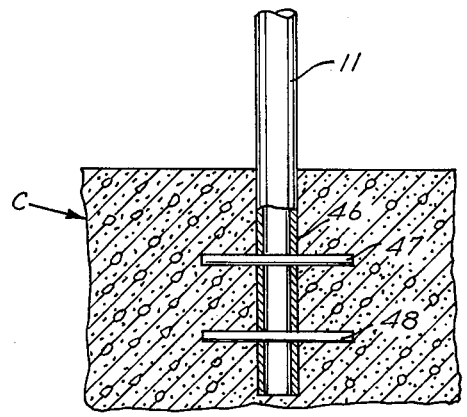
FIG. 10 is a fragmentary vertical sectional view showing a lower end of the post mounted in concrete.

A further mounting arrangement shown in FIG. 10 has a post with a lower extension 46 provided with vertically spaced laterally extending pins 47 and 48 passing transversely through the post extension and embedded in the concrete support represented at C.

Figure 11:
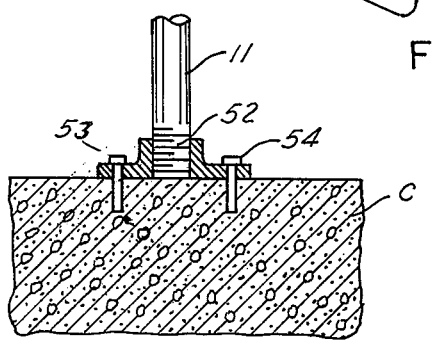
FIG. 11 is a fragmentary vertical sectional view showing the post threaded into a flange secured to a concrete base.

Yet another alternative mounting arrangement shown in FIG. 11 has a post with external threads 52 at the lower end and an annular flange 53 with internal threads into which the external threads of the post are threaded. The flange is shown as fixedly secured to the concrete C by bolt fasteners 54.

Figure 12:
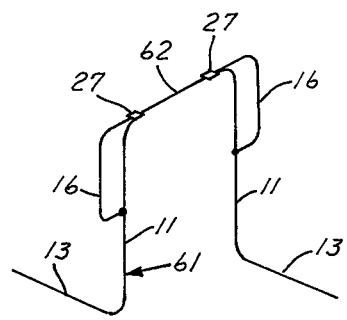
FIG. 12 is a perspective diagrammatic view of a bicycle stand-lock to accomodate two bicycles.

In order to accomodate two bicycles as shown in FIG. 12 there is provided an inverted substantially U-shaped framework 61 made of metal pipe forming two spaced post sections 11 joined by an upper cross-connecting section 62 with a base section 13 at the lower end of one post section 11 projecting at right angles thereto in one direction and a base section 13 at the lower end of the other post section 11 projecting at right angles thereto in the opposite direction so that the framework 61 is a balanced configuration that will support the post sections upright when disposed on a horizontal support surface. The locking arms 16 are pivotally mounted in an opposed relationship on the outer sides of the post sections and swing out and down in opposite directions. While the use of metal pipe and an inverted U-shape as shown in FIG. 12 is advantageous for supporting two locking arms it is appreciated that the inverted U-shape is essentially a single post with locking arms on opposite sides thereof so that for some applications a single post having substantial thickness is suitable for supporting and locking two bicycles.

Figure 13:
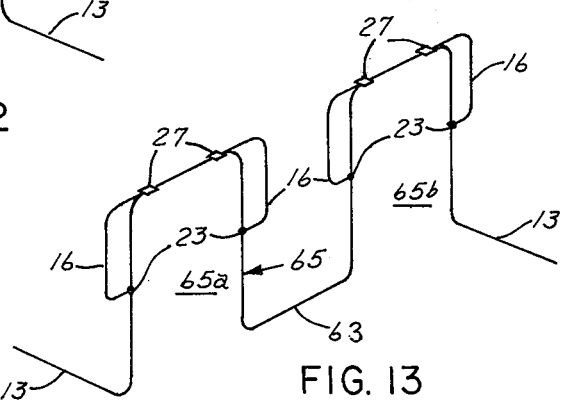
FIG. 13 is a perspective diagrammatic view of a bicycle stand-lock to accomodate four bicycles.

In the form of bicycle stand-lock apparatus shown in FIG. 13 suitable for more than two bicycles, the framework 65 has two inverted U-shaped sections 65a and 65b joined by a lower cross-connecting section 63, each U-shaped section providing two spaced post sections 11. The framework 65 also has the transverse base sections 13 at opposite ends extending in opposite directions. In this arrangement there are two inside locking arms 16 facing one another that swing downwardly and inwardly toward one another to the open position about the lower pivots 23 and two outside locking arms 16 that swing downwardly and outwardly away from one another to the open position. All of the locking arms shown in FIG. 13 are in a straight line arrangement and pivot in a common vertical plane. A framework of the type disclosed is extremely durable and flexible and will usually be in a straight line arrangement as shown in FIGS. 12 and 13. However, it is understood that it could be in a circular, rectangular or like closed configuration if desired.

From the foregoing, it is apparent that a bicycle stand-lock apparatus that is constructed almost entirely of a heavy duty metal pipe throughout with heavy gage lugs is not subject to a ready or quick destruction by a potential thief.

Although the present invention has been described with a certain degree of particularity, it is understood that the present disclosure has been made by way of example and that changes in details of structure may be made without departing from the spirit thereof.

What is claimed is:

1. Bicycle stand-lock apparatus adapted to surround a portion of the frame of a bicycle comprising:
   post means,
   a locking arm having a free upper end and a lower end pivotally mounted at an intermediate portion of the post means to swing relative to the post means between a depending open position arranged for providing access for a bicycle for the positioning of the frame of the bicycle in a juxtaposed relation to the post means and locking arm and an upstanding closed position wherein the locking arm cooperates with the post means to surround a portion of the frame of the bicycle between the front and the rear wheels thereof, said post means and locking arm having cooperating connector means to provide for the securing of the free upper end of the locking arm at the closed position, said post means having a base section extending from the lower end, said post means having a top section at the upper end extending at right angles to the post means, said post means and top section being made of a length of metal pipe bent at right angles to one another.

2. Bicycle stand-lock apparatus as set forth in claim 1 wherein said locking arm has a yoke at its free end comprised of two spaced lugs forming a center slot, said post means carrying a center lug slidably received in said slot, said lugs having apertures alined in the closed position adapted to receive a padlock-type member.

3. Bicycle stand-lock apparatus as set forth in claim 1 wherein the lower end portion of the locking arm is pivotally mounted in a generally U-shaped support attached to the post means, said support comprised of a pair of spaced arms forming a slot receiving the lower end portion and a right angle bracket portion secured to the post, there being a hinge pin supported by the arms and extending through said lower end portion.

4. Bicycle stand-lock apparatus as set forth in claim 1 wherein the lower end portion of the locking arm is pivotally mounted in a generally U-shaped support on the post means, said support comprised of a pair of spaced arms forming a slot receiving the lower end portion, there being a hinge pin supported by the arms and extending through said lower end portion.

5. Bicycle stand-lock apparatus as set forth in claim 1 wherein said base section is a lower extension having at least one transverse rod adapted to be embedded in a base.

6. Bicycle stand-lock apparatus as set forth in claim 1 wherein said base section is a threaded section adapted to thread into an internally threaded flange affixed to a base.

7. Bicycle stand-lock apparatus as set forth in claim 1 wherein said post means has at least two locking arms on opposite sides of the post means adapted to swing down and away from one another to the open position.

8. Bicycle stand-lock apparatus as set forth in claim 1 wherein a pair of opposed pads are disposed along the inside of the locking arm and post means to cushion and protect the bicycle.

9. Bicycle stand-lock apparatus as set forth in claim 1 further including a padlock-type member locking said locking arm in the closed position.

10. Bicycle stand-lock apparatus as set forth in claim 1 wherein said connector means includes a lug on said free upper end adapted to aline with a lug on the post means in said closed position to receive a padlock-type lock member.

11. Bicycle stand-lock apparatus adapted to surround a portion of the frame of a bicycle comprising:
a support framework made of two upright spaced post sections connected at the upper ends by an upper cross-converting section and a base section extending in a direction at substantially right angles to each of the post sections at the lower ends thereof, said base sections extending in opposite directions to dispose the post sections in an upright position when disposed on a planar support surface, said base sections being adapted to be fixedly secured to the support surface,
a locking arm carried by each of said post sections, each said locking arm having a free upper end and a lower end pivotally mounted at an intermediate portion of the associated post section to swing relative thereto between a depending open position arranged for providing access for a bicycle for the positioning of the frame of the bicycle in a juxtaposed relation to the associated post section and locking arm and an upstanding closed position wherein the locking arm cooperates with the associated post section to surround a portion of the frame of the bicycle between the front and rear wheels thereof, each said post section and associated locking arm having cooperating connector means to provide for the securing of the free upper end of the locking arm at the closed position, said locking arms being adapted to swing down and away from one another to the open positions.

12. Bicycle stand-lock apparatus adapted to surround a portion of the frame of a bicycle comprising:
a support framework inclusive of an upright intermediate post section and a base section extending outwardly from the lower end of the post section at substantially right angles thereto, said framework being made of a length of metal pipe bent at right angles to form said post and base sections, said post section having an upper lug at the upper end thereof and a pair of spaced intermediate lugs at an intermediate portion thereof, and
a rigid, integral, generally C-shaped locking arm made of metal pipe having an intermediate portion, a free turned upper end portion and a turned lower end portion, said end portions extending at substantially right angles to the intermediate portion, said lower end portion being pivotally mounted at its terminal end on said intermediate lugs, said intermediate lugs positioning said locking arm away from said framework to allow said locking arm to swing relative to the post means between a depending open position arranged for providing access for a bicycle for the positioning of the frame of the bicycle in a juxtaposed relation to the post section and locking arm and an upstanding closed position wherein the locking arm cooperates with the post section to surround a portion of the frame of the bicycle between the front and the rear wheels thereof, said locking arm having a lug at the free turned upper end portion cooperating with said upper lug on said post section and a padlock member extending through said upper lugs securing the locking arm at the closed position.

13. Bicycle stand-lock apparatus adapted to surround a portion of the frame of a bicycle comprising:
a support framework made of at least two inverted U-shaped sections connected at adjacent ends by a lower cross-connecting section, each said U-shaped section providing a pair of upright post sections,
a base section extending in a direction at substantially right angles to the outer lower ends of said U-shaped sections, said base sections extending in opposite directions to dispose the post sections in an upright position when disposed on a planar support surface, said base sections being adapted to be fixedly secured to the support surface, and
a locking arm carried by each of said post sections, each said locking arm having a free upper end and a lower end pivotally mounted at an intermediate portion of the associated post section to swing relative thereto between a depending open position arranged for providing access for a bicycle for the positioning of the frame of the bicycle in a juxtaposed relation to the associated post section and locking arm and an upstanding closed position wherein the locking arm cooperates with the associated post section to surround a portion of the frame of the bicycle between the front and rear wheels thereof, each said post section and associated locking arm having cooperating connector means to provide for the securing of the free upper end of the locking arm at the closed position, and inner pair of said locking arms being adapted to swing down and away toward one another to the open position and an outer pair of said locking arms being adapted to swing down and away from one another.

* * * * *

UNITED STATES PATENT OFFICE
CERTIFICATE OF CORRECTION

Patent No. 3,918,279  Dated November 11, 1975

Inventor(s) Donald J. Williamson

It is certified that error appears in the above-identified patent and that said Letters Patent are hereby corrected as shown below:

In the heading to the printed specification, lines 6-7, delete "[73] Assignee: United States Steel Corporation, Pittsburgh, Pa."

Signed and Sealed this ninth Day of March 1976

[SEAL]

Attest:

RUTH C. MASON
Attesting Officer

C. MARSHALL DANN
Commissioner of Patents and Trademarks